Figure 4:
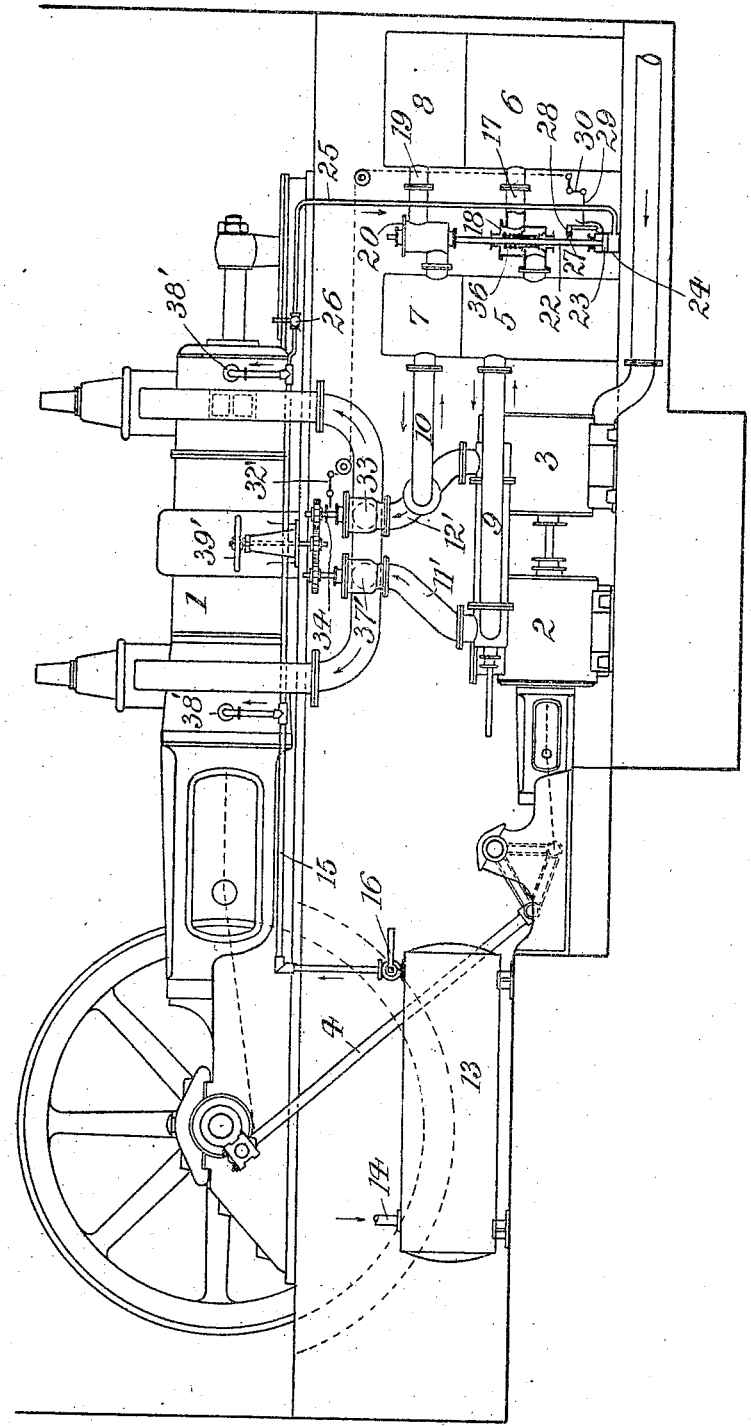

No. 884,619.
P. SCHWEHM.
STARTING MECHANISM FOR GAS ENGINES.
APPLICATION FILED MAR. 1, 1906.
PATENTED APR. 14, 1908.
2 SHEETS—SHEET 1.
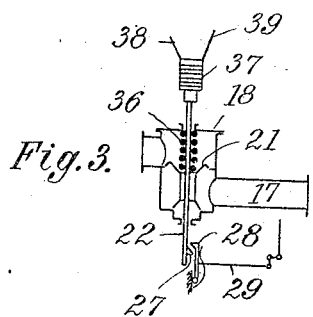
Fig. 3.
Fig. 1.
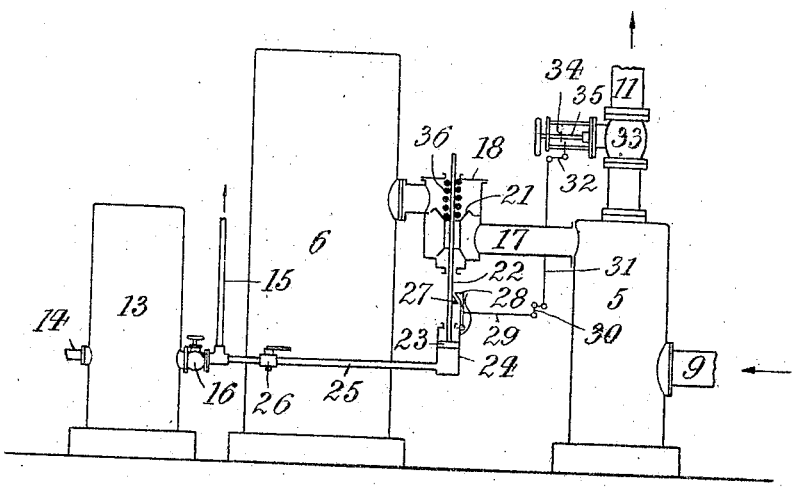
Fig. 2.
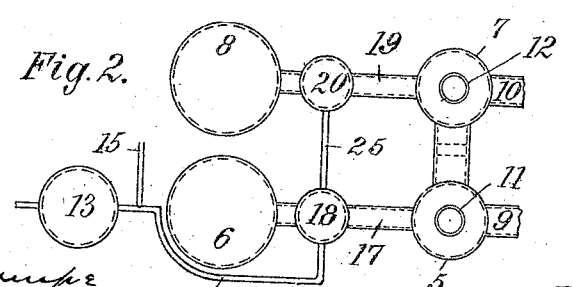
Witnesses:
Arthur E. Gumpe
William Schulz
Inventor:
Peter Schwehm,
by Hauss v Briesen
Atty.

UNITED STATES PATENT OFFICE.

PETER SCHWEHM, OF HANOVER, GERMANY.

STARTING MECHANISM FOR GAS-ENGINES.

No. 884,619.  Specification of Letters Patent.  Patented April 14, 1908.

Application filed March 1, 1906. Serial No. 303,581.

*To all whom it may concern:*

Be it known that I, PETER SCHWEHM, a citizen of Germany, residing at Hanover, Germany, have invented new and useful Improvements in Starting Mechanism for Gas-Engines, of which the following is a specification.

This invention relates to an improved mechanism for starting a gas engine more particularly when the same is under a load.

In the accompanying drawing: Figure 1 is a diagrammatic view, showing the gas tanks, air tanks and connecting parts; Fig. 2 a diagrammatic plan, showing the arrangement of the tanks, on a reduced scale, Fig. 3 illustrates a modification of the check-valve, and Fig. 4 is a side elevation showing my improved starting mechanism applied to a gas engine.

The numerals 5, 6, indicate the tanks for charge-air, while 7, 8, indicate the tanks for charge-gas. The air tanks 5, 6, receive air under pressure by pipe 9 from a suitable pump, (not shown), while gas tanks 7, 8, receive gas under pressure by pipe 10 from a gas pump. Cylinders 5 and 7 communicate by pipes 11 and 12, respectively, with the working cylinder of the gas engine. For starting the engine, an auxiliary tank 13 is provided that receives air under pressure through pipe 14. A pipe 15 controlled by valve 16 connects tank 13 with the gas engine. Tanks 5 and 6 communicate with each other by a pipe 17 controlled by a check-valve 18, while tanks 7 and 8 communicate with each other by a pipe 19 controlled by check-valve 20. As valves 18 and 20 are of the same construction, valve 18 only is shown in detail; the description of this valve also, applying to valve 20. A valve-disk 21 is secured to a vertical spindle 22, to the lower end of which a piston 23 is secured. The latter is inclosed in a cylinder 24 that by branch 25 having valve 26 communicates with pipe 15. Spindle 22 is provided with a nose 27 adapted to engage a spring-influenced catch 28 pivotally connected to cylinder 24. Catch 28, is by rod 29, bell-crank 30, rod 31 and bell-crank 32, operatively connected to the supply valve 33 of pipe 11, a collar 34 on valve-spindle 35, being adapted to engage the free arm of bell-crank 32.

In the modification shown in Fig. 3, valve-disk 21 is raised by means of a solenoid 37 connected by wires 38, 39, to a suitable source of electricity.

In Fig. 4, a gas engine 1, is represented which is provided with my improved starting mechanism, the tanks 7 and 8 being here shown above tanks 5 and 6 respectively, for the sake of greater clearness. So also the valve-disks 21 of valves 18 and 20 are mounted on a common spindle 22, so that both valves will be operated simultaneously. For starting the engine when tanks 5, 6, 7 and 8 are empty, valve 16 is opened to admit air under pressure from tank 13 to engine 1, through pipe 15. The air under pressure entering the engine will cause the latter to slowly rotate and simultaneously operate the air pump 2 and gas pump 3, which are connected to the engine by rod 4. During this operation the large tanks 6 and 8 are separated by closed valves 18 and 20 from the small tanks 5 and 7 respectively. In this way power and time is economized, as the small tanks only are charged while running the engine with compressed air from tank 13. After the pressure in tanks 5 and 7 is sufficiently high, the igniter, (not shown), is started and valves 33 and 37' of the gas pipe 12' and air pipe 11' are opened, while back pressure valves 38' are held closed. When the engine has attained its normal number of revolutions, tanks 6 and 8 are connected to tanks 5 and 7 by gradually opening valve 26 of pipe 15. In this way air under pressure is admitted to cylinder 24 beneath piston 23 to gradually open valves 18 and 20. By opening these valves slowly, a sudden reduction in pressure is prevented, while the air and gas flow into large tanks 6 and 8 respectively. After valves 18 and 20 have been fully opened, catch 28 will engage nose 27 of spindle 22, to maintain the valves in their open position, even after valve 26 has been closed.

For stopping the machine, valves 33 and 37' are closed by rotating a hand wheel 39' operably connected to both valves. During this operation disk 34, in moving downwards, will tilt lever 32' to correspondingly tilt lever 30 and withdraw catch 28 from nose 27. In this way springs 36 acting upon the disks of valves 18 and 20 will close the latter to automatically separate tanks 6 and 8 from tanks 5 and 7 respectively. After valves 33 and 37' have been closed, the engine will continue to rotate for a short time owing to its inherent kinetic energy, thereby actuating pumps 2 and 3. Most of the air and gas thus compressed will be forced through small tanks 5 and 7 into large tanks 6 and 8 respectively, valves 18 and 20 acting as back pressure valves. In this way air and gas under a higher pressure than normal will be stored in tanks 6 and 8 after the engine has come to a standstill. This air and gas under high pressure is normally used for starting the engine, valve 26 being previously opened to connect the small and large tanks. In this way the engine receives a full charge in starting, thus producing heavy explosions, so that the engine may be readily started under load. It is obvious that instead of employing separate tank-pairs for air and gas, a double tank for the mixed charge may be used without departing from the spirit of my invention.

It will be seen that tanks 5, 6 and 7, 8, when coupled, will store a large quantity of air and gas during the operation of the engine, so that the charge pressure may be maintained almost constant with varying loads. By subdividing the tanks into smaller and larger ones, a quick starting of the engine is effected, as only the small tanks need be charged with air and gas under pressure. Furthermore, by interposing valves between the differently sized tanks, which valves act as back pressure valves, the larger tanks may be charged with air and gas under an excessive pressure during the gradual stopping of the engine. By using this excessive pressure, the engine may subsequently be re-started under load.

I claim:

1. In a device of the character described, a reciprocating gas engine, and a pump, combined with first and second charge tanks, a pipe connecting the pump with the first tank, means for connecting said first tank to the engine, a pipe connecting the first and second tanks, a spring-closed valve controlling said pipe, and means for maintaining the valve open during the normal run of the engine against the action of the spring, substantially as specified.

2. In a device of the character described, a pair of charge tanks, means for establishing communication between said tanks, a check-valve controlling such communication, a second valve controlling the discharge of one of said tanks, and means for operatively connecting the second valve with the check-valve, substantially as specified.

3. In a device of the character described, a pair of charge tanks, means for establishing communication between said tanks, a check-valve controlling such communication, a third tank having a discharge pipe, a valve controlling said pipe, and means controlled by said valve for opening the check-valve, substantially as specified.

4. In a device of the character described, a pair of charge tanks, means for establishing communication between said tanks, a check-valve controlling such communication, and means for maintaining the check-valve in its open position during the operation of the engine, substantially as specified.

Signed by me at Hanover, Germany, this 13th day of February, 1906.

PETER SCHWEHM.

Witnesses:
LEONORE RASCH,
ANNA DIPPEL.